United States Patent [19]

Takai

[11] Patent Number: 4,628,381
[45] Date of Patent: Dec. 9, 1986

[54] EJECTION MECHANISM FOR TAPE PLAYER

[75] Inventor: Kazuki Takai, Tokyo, Japan
[73] Assignee: Clarion Co., Ltd., Tokyo, Japan
[21] Appl. No.: 592,159
[22] Filed: Mar. 22, 1984

[30] Foreign Application Priority Data

Mar. 31, 1983 [JP] Japan .................................. 58-53992

[51] Int. Cl.⁴ ............................................. G11B 15/00
[52] U.S. Cl. ..................................... 360/93; 360/96.5
[58] Field of Search ....................... 360/88, 90, 95, 93, 360/96.1, 96.5, 96.6; 242/198, 199

[56] References Cited

U.S. PATENT DOCUMENTS

| | | | |
|---|---|---|---|
| 3,867,721 | 2/1975 | Saunders | 360/93 |
| 3,867,722 | 2/1975 | Syohji | 360/96.6 |
| 4,308,562 | 12/1981 | Negishi | 360/93 |
| 4,510,540 | 4/1985 | Kato | 360/93 |

*Primary Examiner*—Robert S. Tupper
*Assistant Examiner*—Andrew L. Sniezek
*Attorney, Agent, or Firm*—Flynn, Thiel, Boutell & Tanis

[57] ABSTRACT

In a tape player having a pack guide movable up and down with respect to a reel base, a pack stopper movable back and forth relative to the pack guide, a swing plate supported for rotation relative to the pack guide, an inversion spring connected between the pack stopper and the swing plate and an ejection lever connected to the swing lever, so as to complete loading and ejection of a cassette by means of the expansion force of the inversion spring, the ejection mechanism comprises an eject lock arm pivotably supported relative to the pack guide and having one end which extends across the movement path of the pack stopper, a lock plate connected to the other end of the eject lock arm to lock the pack guide at the lifted position, a spring biasing the lock plate in a direction to maintain the locking of the pack guide, and a check arrangement combined with the eject lock arm to engage the pack stopper when the pack stopper moves forwardly to convey the cassette to the ejecting position.

7 Claims, 20 Drawing Figures

EJECTION MECHANISM FOR TAPE PLAYER

FIELD OF THE INVENTION

This invention relates to an ejection mechanism of a cassette-type tape player to bring a tape pack from the play position to the exterior of the tape player.

BACKGROUND OF THE INVENTION

Playback or recording mode of a cassette-type tape player is created by engagement between reel holes of a cassette and reel axles vertically standing from a base plate of the tape player. To effect this engagement, several cassette loading arrangements are employed, depending upon whichever direction the cassette is inserted from with respect to the tape player. One of the arrangements is called "horizontal loading" wherein a cassette is inserted horizontally through an opening of the front face of a tape player toward a pack guide, and the pack guide carrying the cassette in position thereon is dropped onto a reel base so as to engage the reel holes with the reel axles.

One of tape players of this type is adapted so that a cassette which is manually pushed up to a certain position on the pack guide is thereafter automatically conveyed to the full extent on the pack guide by a loading/ejection mechanism. One of such loading mechanisms employs a motor power and another employs a spring force to fully engage the tape cassette with the tape guide. Among these, one loading mechanism uses a single inversion spring which pushes the cassette not only backward into the full engagement with the pack guide but also forward to the ejecting position.

FIG. 1 shows a loading/ejection mechanism including such an inversion spring. A guide arm 2 supporting a pack guide 1 has an upper plate which has formed a guide slot 3 elongated back and forth of a tape player and receiving therein a pack stopper 4 engageable with a cassette. An inversion spring 6, a torsion spring, is connected between a pin 4a on the pack stopper 4 and one end of a swing plate 5 rotatably mounted on the guide arm 2. A first end of the inversion spring 6 connected to the pin 4a has an arcuate configuration so as to rotate about the pin 4a. A second end of the inversion spring 6 connected to the swing plate 5 is rotatable in a hole formed in the swing plate 5. The other end of the swing plate 5 is supported by a pivot axle 7. An operation rod 9 connects a central portion of the swing plate 5 to an ejection lever 8 which is manually operated.

The ejection lever 8 is biased forwardly (leftward in FIG. 1A) by a spring 11 fixed to a pin 10 on a frame of the tape player.

An eject lock arm 12 is mounted substantially symmetrically to the swing plate 5 with respect to the pack stopper 4. The eject lock arm 12 is rotatably mounted on the guide arm 2 by an axle 12a. A first end of the eject lock arm 12 has a contact surface 12b to be pushed by the back end of the pack stopper 4. A second end of the eject lock arm 12 which is symmetric to the first end 12b with respect to the axle 12a is connected to a lock plate 13 for locking the pack guide 1 at an elevated position. The lock plate 13 extends back and forth of the tape player and is normally biased backward to the locking position (to the right in FIG. 1). The lock plate 13 has a cutout 15 which consists of narrower and wider halves defined by a step 15b and engages a pin 2a on the guide arm 2. The pin 2a enters in the wider half and rides on the step 15b when the pack guide 1 is fully elevated, but otherwise engages a side wall 15a of the narrower half of the cutout 15 (FIG. 1a).

When a cassette is manually inserted into the pack guide 1, the cassette pushes the pack stopper 4 back into the tape player (to the right in the Figure). The inversion spring 6 connected to the pack guide 4 is compressed, accordingly.

In FIG. 2, the pack stopper has been pushed by a manual force to a position in which the first end of the inversion spring 6 to the right of the second end connected to the swing plate 5. Since the swing plate 5 is now kept unrotatable, the expansion force of the inversion spring is oriented backward (to the right in the Figure), or in other words is inverted as to the pack stopper 4, and automatically fully pushes the pack stopper 4 and the cassette carried thereon to the innermost (rightmost) end of the tape player.

Along with the backward movement, the pack stopper 4 pushes the first end 12b of the eject lock arm 12 and rotates it in the clockwise direction about the axle 12a. Therefore, the second end of the eject lock arm 12 moves the lock plate 13 forwardly against urging of a spring 14. The pin 2a of the guide arm 2 is thereby allowed to drop from the step 15b and engage the side wall 15a of the narrower half of the cutout 15. Therefore, the pack guide 1 can drop onto the reel base with the energy of the spring 11 biasing the ejection lever 8. When the pack guide 1 fully drops to a position whereat the pin 2a reaches the open end of the cutout 15, the cassette loading is completed.

For effecting a cassette ejecting operation, the ejection lever 8 is depressed to elevate the pack guide 1. With this depression, the pin 2a moves back along the side wall 15a and enters into the wider half of the cutout 15. The lock plate 13 which was locked at the forward position by engagement between the side wall 15a and the pin 2a is allowed to return to the backward position with the energy of the spring 14. The pin 2a then engages the step 15b and locks the pack guide 1 at the elevated position. The eject lock arm 12 linked to the lock plate 13 rotates in the counterclockwise direction so as to move the end 12b thereof forwardly.

At the same time, the depression of the ejection lever 8 is transmitted to the swing plate 5 via the operation rod 9. The swing plate 5 rotates in the counterclockwise direction while compressing the inversion spring 6, until the second end of the inversion spring 6 comes to the right of the first end connected to the pin 4a of the pack stopper 4. As the result, the pack stopper 4 is pushed forward together with the cassette by the expansion energy of the inversion spring 6. After this, when the ejection lever 8 returns to the left due to the energy of the spring 11, the swing plate 5 and the pack stopper 4 connected thereto via the inversion spring 6 rotate or move forward and eject the cassette from the pack guide 1.

The prior art, however, involves the following problem. The ejection mechanism using the inversion spring 6 cannot perform its reliable operation unless application of forward pressure to the cassette by the inversion spring 6 coincides with locking of the pack guide 1 at the elevated position. In the prior art mechanism, however, since the pack stopper 4 and the eject lock arm 12 are not directly interlinked during the ejecting operation, a time lag therebetween causes the following problem. Namely, if the inversion spring pushes the cassette forward earlier, the pack stopper 4 starts to move to the left before the pack guide 1 is fully elevated. If a manual force continues to push the ejection lever after the spring is inverted and until the pack guide 4 is fully elevated to the lock position, no problem will occur. However, if the manual force is removed halfway through this sequence, the pack guide 1 drops onto the reel base again, and sometimes forcibly pins down the cassette which already started to move forward to the ejection position due to the inversion spring. In this state, if a user dares to manually pull the cassette by force, it will lead to a great damage of the tape player. Alternatively, even if the user can barely take it out, he cannot reinsert a cassette because the pack guide 1 which dropped onto the reel base remains there.

OBJECT OF THE INVENTION

It is therefore an object of the present invention to provide an ejection mechanism which never enables cassette ejection by the inversion spring when a manual pushing force to the ejection lever is incomplete, and instead enables the cassette ejection only when the manual force is sufficient to complete the ejecting operation.

SUMMARY OF THE INVENTION

In accordance with the invention, there is provided an ejection mechanism of a tape player which comprises:

a pack guide movable up and down on a reel base;

a pack stopper movable backwardly and forwardly relative to said pack guide;

a swing plate rotatably supported with respect to said pack guide;

a manually operated ejection lever coupled to said swing plate;

an inversion spring connecting said pack stopper to said swing plate so that when said swing plate compresses said inversion spring with an actuation of said ejection lever, the expansion force of said inversion spring is inverted so as to push said pack stopper forwardly;

an eject lock arm pivotably supported with respect to said pack guide so that an end thereof moves back and forth along the movement path of said pack stopper;

a lock plate coupled to the other end of said eject lock arm to lock said pack guide at an elevated position;

a lock spring biasing said lock plate in a direction for maintaining locking engagement with said pack guide; and a check means provided on said eject lock arm to engage said pack stopper when the pack stopper moves forwardly toward the ejecting position, whereby the pack stopper is interlinked to the lock mechanism including the lock plate via the eject lock arm so that the pack stopper starts moving to its initial position for removal of a cassette only when the pack guide is fully elevated and reliably locked there by the lock mechanism.

The invention will be better understood from the following detailed description referring to preferred embodiments illustrated in the accompanying drawings.

DETAILED DESCRIPTION OF THE PREFERRED EMBODIMENTS

Figure 1A:
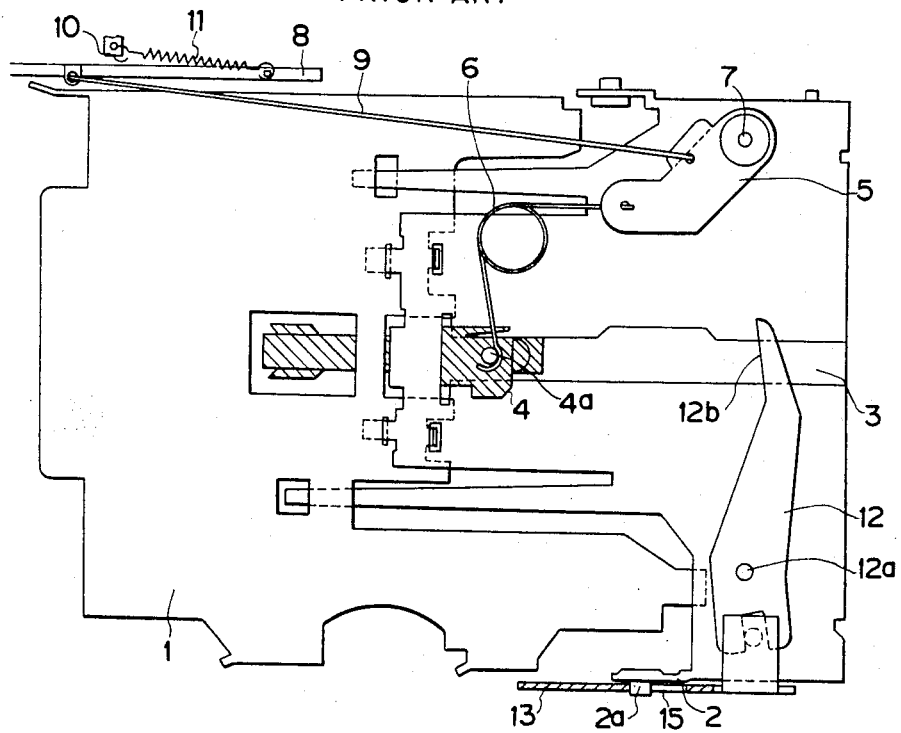
FIGS. 1a and 1b are plan and side-elevation views showing a prior art ejection mechanism wherein a cassette is not loaded yet.
Figure 1B:
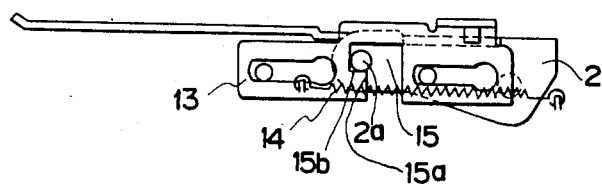
Figure 2A:
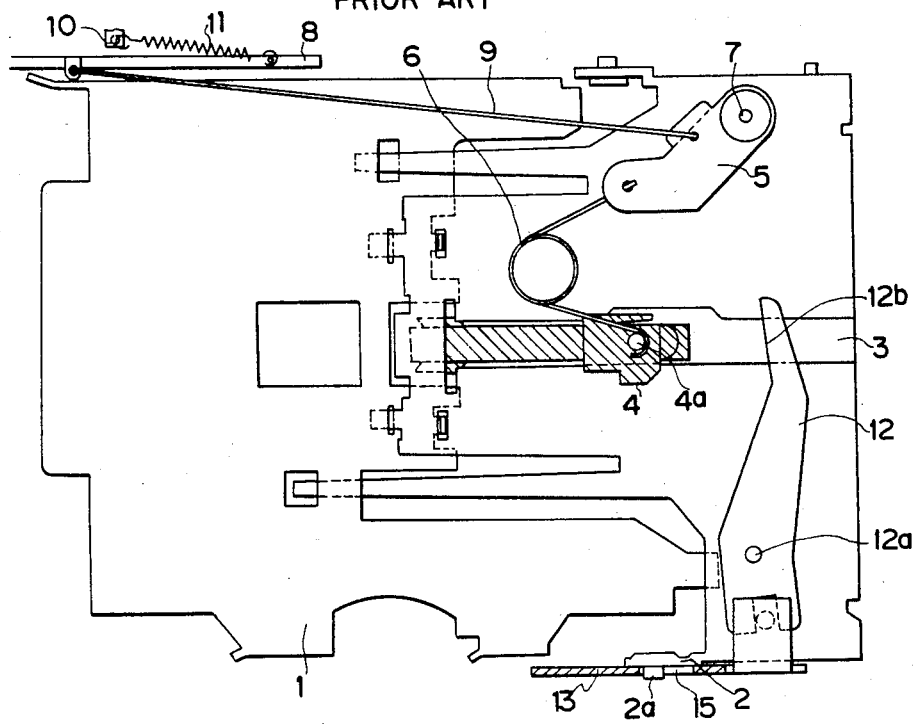
FIGS. 2a and 2b are plan and side-elevation views of the prior art mechanism of FIG. 1 wherein a cassette is on the way to a play position.
Figure 2B:
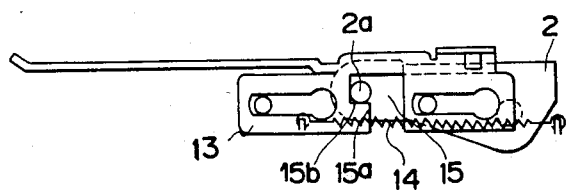
Figure 3A:
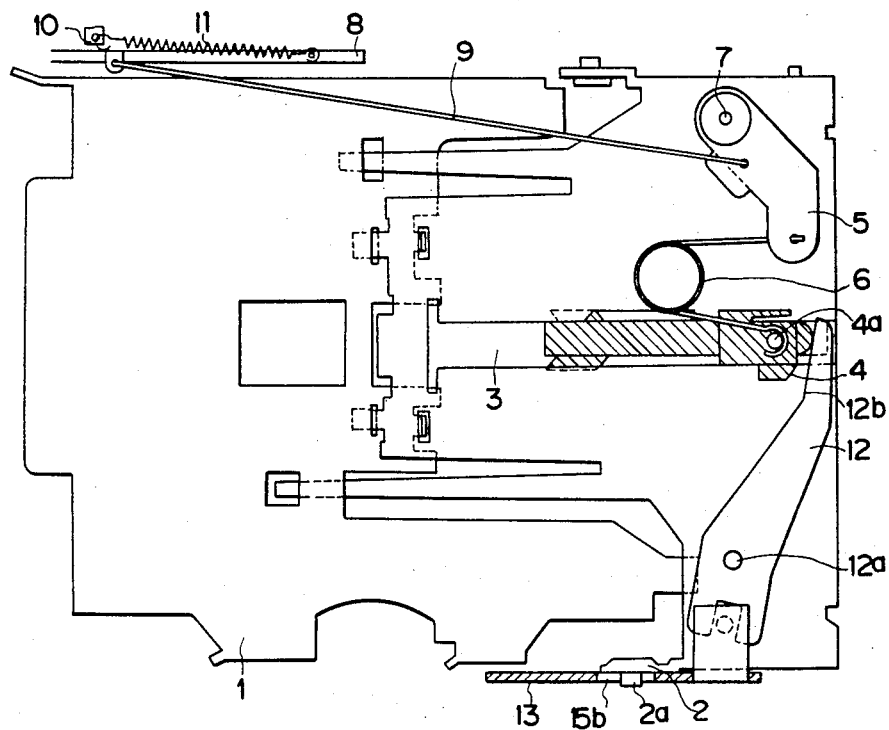
FIGS. 3a and 3b are plan and side-elevation views of the prior art mechanism of FIGS. 1 and 2 wherein an ejection lever is depressed.
Figure 3B:
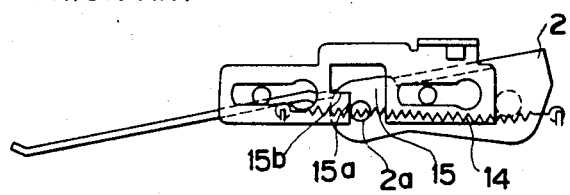

In FIGS. 4 through 10 showing several embodiments of the invention, the same components as those illustrated in FIGS. 1 through 3 are designated by the same reference numerals, and are not specifically explained hereunder. The left hand of the Figures corresponds to the front face of the tape player and is expressed by the term "front" or "forward" in the text, whilst the right hand of the Figures corresponds to the back face of the tape player and is expressed by the term "rear" or "back" in the text.

Figure 4A:
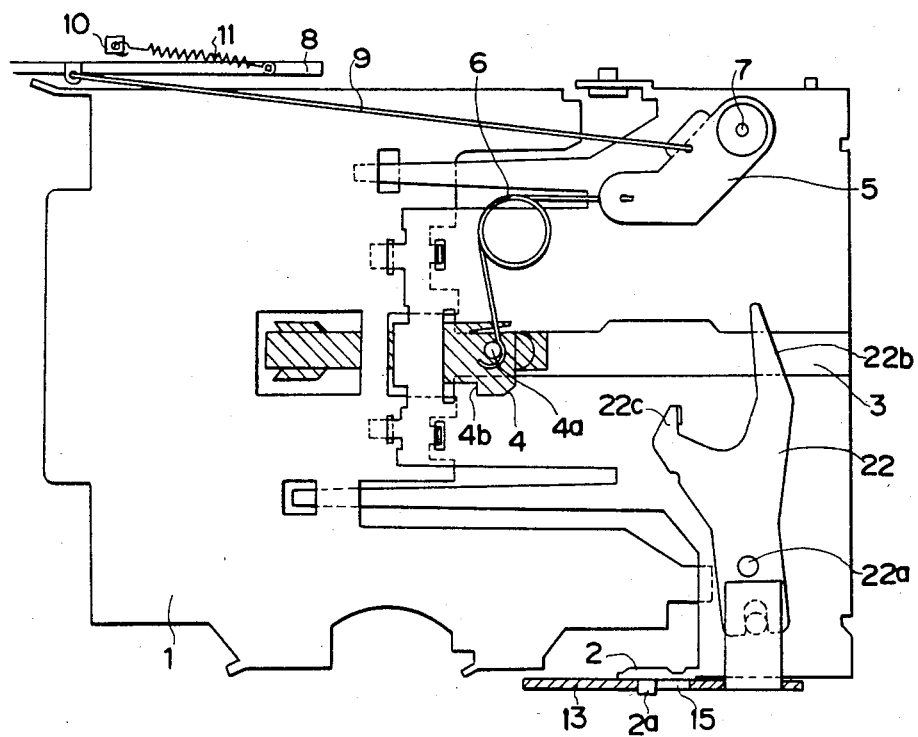
FIGS. 4a and 4b are plan and side-elevation views of first embodiment of the invention wherein a cassette is not loaded yet.
Figure 4B:
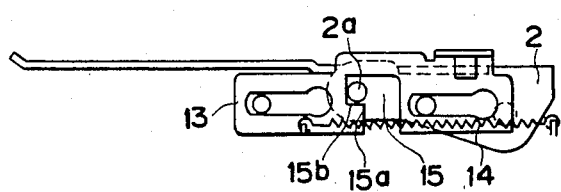
Figure 5A:
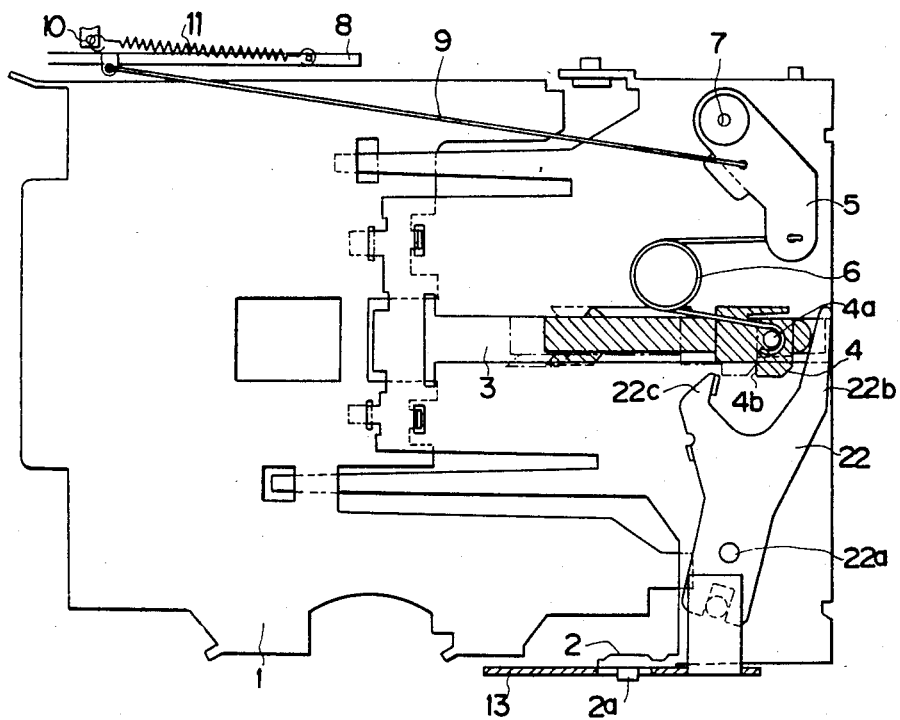
FIGS. 5a and 5b are plan and side-elevation views of the first embodiment wherein the ejection lever is depressed.
Figure 5B:
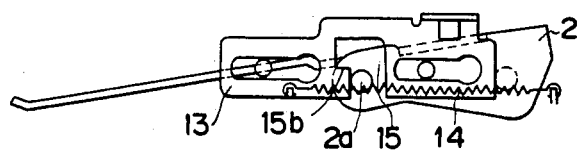

First Embodiment (FIGS. 4 and 5)

An eject lock arm 22 is disposed symmetrically of the swing plate 5 with respect to the pack stopper 4, and is rotatably supported on the guide arm 2 by an axle 22a. The eject lock arm 22 has a fork-shaped end with two fingers, the front one of which is shorter and the rear one is longer. The longer finger is a contact member 22b which is long enough to always overlap the movement path of the pack stopper which moves in the guide slit 3 of the guide arm 2. The shorter finger is a check member 22c defined by a tapered edge and contactable with a step 4b formed on the opposed face of the pack stopper 4. For a time during the displacement of the pack stopper 4 in the guide slit 3, the pack stopper 4 is sandwiched by these two fingers of the eject lock arm 22. With this arrangement, cassette insertion is effected in substantially the same way as in the prior art mechanism. Namely, when the pack stopper 4 moves rearward and carries the cassette up to a position, they are automatically conveyed back to the full extent by the expansion energy of the inversion spring 6. During this displacement, the rear end of the pack stopper 4 pushes the contact member 22b of the eject lock arm 22, and the step 4b of the pack stopper 4 subsequently contacts the check member 22c of the eject lock arm 22. The eject lock arm 22 is rotated away from its initial position in the clockwise direction, accordingly. When the pack stopper 4 is brought to the rearmost position, the lock plate 13 linked thereto by the eject lock arm 22 completes its displacement to the unlocking or release position, and allows the pin 2a to escape from the step 15b and allows the pack guide 1 to drop onto the reel base, or in other words from an insertion position down to a loaded position. Thus, the cassette loading is completed.

To eject the cassette, a user presses the ejection lever 8 rightwardly, which rotates the swing plate 5 in the counterclockwise direction from its normal position to an eject position. The swing plate 5 compresses the inversion spring 6 as it moves to a position in which the second end of the spring is rearward of the first end connected to the pack stopper 4, as in the prior art mechanism. Concurrently, the pack guide 1 operatively linked to the ejection lever 8 starts lifting up so that the pin 2a of the guide arm 2 climbs up the side wall 15a of the narrower half of the cutoff 15 toward the step 15b. At that time, however, since the pack guide 1 is not fully elevated and does not allow the pin 2a to enter into the wider half of the cutoff 15, the lock plate 13 cannot move yet to the locking position. Therefore, the eject lock arm 22 linked to the lock plate 13 remains in the clockwisely rotated check position, and the pack stopper 4 and the cassette which move frontward away from the contact member 22b are checked by the check member 22c which is now unrotatable and engages the step 4b.

When the pack guide 1 is fully lifted, the lock plate 13 can move rearward to the locking position with the energy of the spring 14, and the pin 2a of the guide arm 2 rides on the step 15b in the cutoff 15 so as to lock the pack guide 1 at the fully elevated position. Therefore, the eject lock arm 22 and the check member 22c are now allowed to rotate in the counterclockwise direction along with the rearward displacement of the lock plate 13, so that the pack stopper 4 can continue its frontward movement, pushing and rotating the check member 22c. The pack stopper 4 continues the forward displacement also after disengagement from the check member 22c, and ejects the cassette from the pack guide 1.

If the manual pushing force to the ejection lever 8 is removed after the direction of the expansion force of the inversion spring 6 is inverted and before the pack guide 1 is fully elevated, the cassette starts moving frontward together with the pack stopper 4. The unique construction according to the invention, however, stops this movement soon because the check member 22c of the eject lock arm 22 which still remains unrotatable at the clockwisely rotated position engages the step 4b and checks the frontward movement of the pack stopper 4. Meanwhile, together with the revival movement of the ejection lever 8 due to the energy of the spring 11, the swing plate 5 returns to the initial position which it takes before the cassette insertion so as to bring the second end of the inversion spring 6 frontward of the first end connected to the pack stopper 4. Therefore, the expansion force of the inversion spring 6 is directed rearward and pushes the pack stopper 4 and the cassette to the fully inserted position again, thereby enabling a user to resume the ejecting operation from the beginning.

Figure 6A:
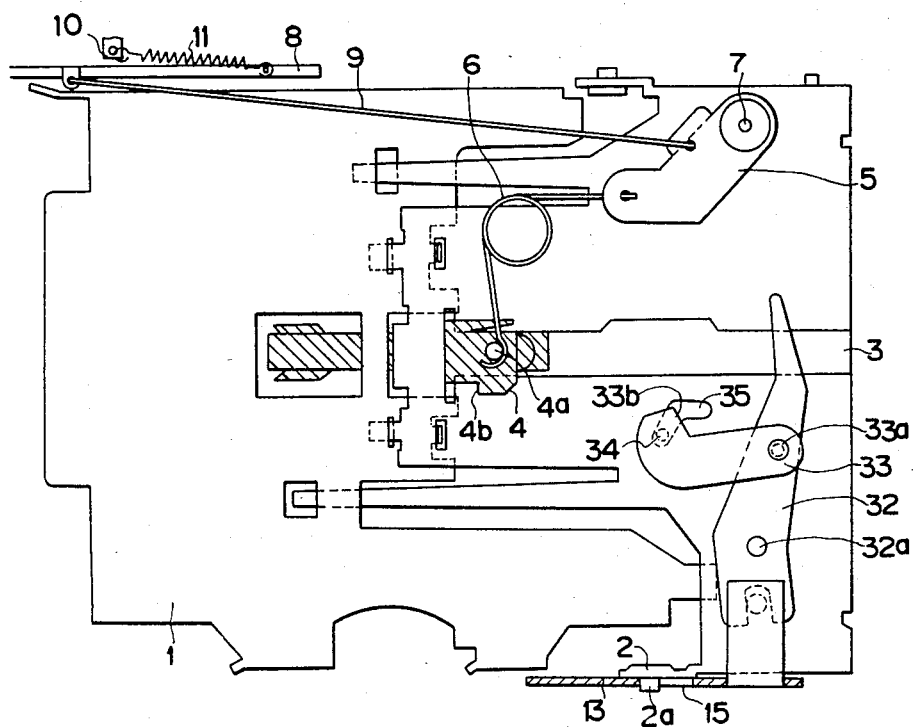
FIGS. 6a and 6b are plan and side-elevation views of second embodiment of the invention wherein a cassette is not loaded yet.
Figure 6B:
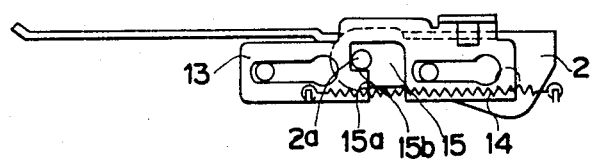
Figure 7A:
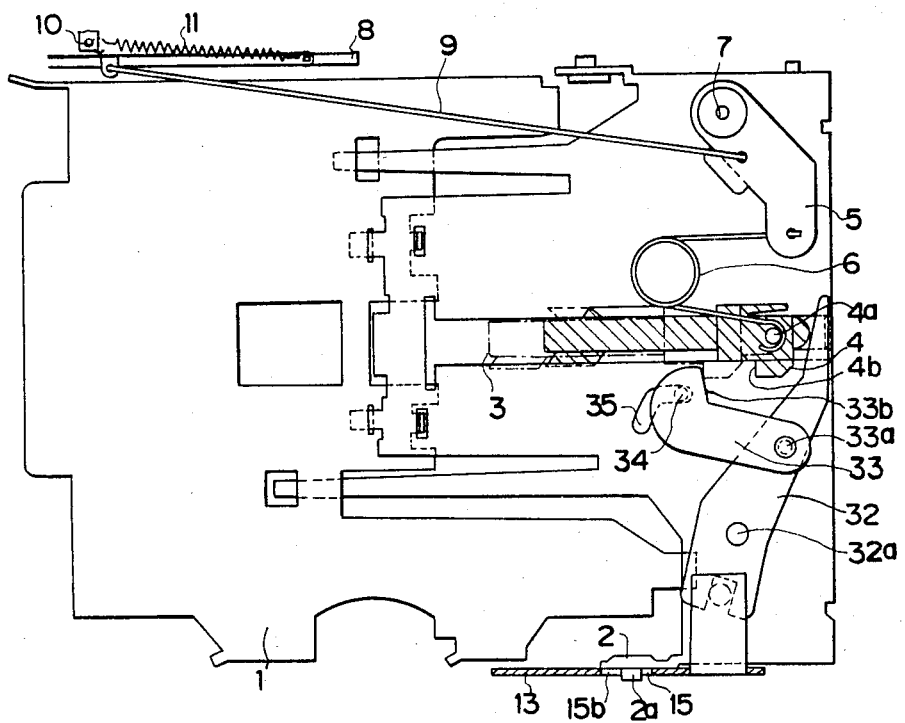
FIGS. 7a and 7b are plan and side-elevation view of the second embodiment wherein an ejection lever is depressed.
Figure 7B:
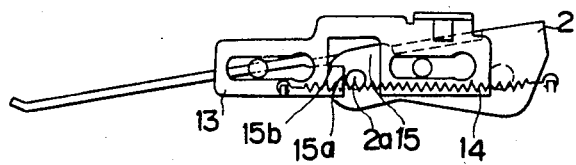

Second Embodiment (FIGS. 6 and 7)

This embodiment employs a check member which is rotatable with respect to an eject lock arm 32, instead of the check member 22c of the first embodiment in FIGS. 4 and 5 which is integral with the eject lock arm 22.

The eject lock arm 32 is rotatably mounted on the pack guide 1 by an axle 32a. The eject lock arm 32 carries a sub-arm 33 which is rotatable about an axle 33a fixed to the eject lock arm 32. The sub-arm 33 has a check member 33b having a tapered edge contactable with the step 4b of the pack stopper 4. Near the check member 33b, a pin 34 extends from the bottom face of the sub-arm 33 and is inserted in a guide hole or slot 35 formed in the pack guide 1. The guide hole or slot 35 consists of a linear half which is elongated parallelly with the slit 3 and an arcuate half which extends from the front end of the linear half in a direction away from the slit 3.

With this arrangement, when the ejection lever 8 is depressed, the pack guide is elevated, and the expansion force of the inversion spring 6 is inverted, as in the first embodiment. Due to the inverted expansion energy of the inversion spring 6, the pack stopper 4 is displaced frontward, and the step 4b thereof engages and pushes the check member 33b. Due to this, the sub-arm 33 is given a tendency to rotate in the counterclockwise direction. However, since the pin 34 is positioned in the linear half of the guide hole 35, the sub-arm 33 cannot rotate alone, and limits frontward displacement of the pack stopper 4. Therefore, before the pack guide 1 is fully elevated and locked there, the combination of the eject lock arm 32 and the sub-arm 33 stops the frontward movement of the pack stopper 4.

When the pack guide 1 is fully elevated, the lock plate 13 moves rearward to the locking position, and the eject lock arm 32 simultaneously rotates in the counterclockwise direction, thereby allowing the pack stopper 4 to resume the frontward displacement. Since the pin 34 of the sub-arm 33 is still in the linear half of the guide hole 35, the sub-arm 33 cannot rotate in the counterclockwise direction irrespective of the pressure from the pack guide 4. Instead, the check member 33b keeps engagement with the step 4b and slides in parallel with the slit 3 in the linear half of the guide hole 35, pulling the eject lock arm 32 connected thereto by the pin 33a in the counterclockwise direction. When the pin 34 escapes from the linear half and enters in the arcuate half of the guide hole 35, the sub-arm 33 can rotate alone about the pin 33a in the counterclockwise direction with the pressure from the pack stopper 4. Meanwhile, the step 4b disengages from the check member 33b and conveys the cassette to the ejecting position.

When the manual pushing force to the ejection lever 8 is removed before the pack guide 1 is fully elevated, this second embodiment is also adapted to bring back the pack stopper 4 and the cassette to the fully inserted position so as to allow a user to retry the ejecting operation from the start, as in the first embodiment.

The second embodiment not only overcomes the problem involved in the prior art mechanism by employment of the direct operative linkage between the pack stopper 4 and the eject lock arm 32 as in the first embodiment, but also ensures a reliable timing of disengagement of the pack stopper 4 from the check member 33b by provision of the relative movement of the check member 33b with respect to the eject lock arm 32.

More specifically, according to the first embodiment, small errors in the inclination of the tapered edge and in the dimension of the check member 22c lead to a considerably large difference in the time when the pack stopper 4 disengages from the check member 22c, because the check member 22c makes a simply arcuate movement about the axle 22a of the eject lock arm 22. If the pack guide 4 disengages from the check member 22c too early, the pack guide 4 might resume the forward movement to the ejecting position before the pack guide 1 is fully elevated. So, the drawback of the prior art mechanism cannot be fully overcome. If the pack guide 4 disengages from the check member 22c too late, the eject lock arm 22 must be rotatable over a larger angle. This requires enlargement of the cutout 15 of the lock plate 13 so as to keep the engagement with the pin 2a of the guide arm 2 over a longer distance. This leads to an increase of the force to unlock the pack guide 1 upon cassette insertion, and disturbs the function of the inversion spring 6 to automatically fully insert the cassette.

The second embodiment, however, reliably maintains the engagement between the pack stopper 4 and the check member 33b up to a proper position for disengagement therebetween (until the pin 34 reaches the arcuate half of the guide hole 35), irrespective of rotation of the eject lock arm 32 and irrespective of the configuration of the check member 33b, because the check member 33b moves linearly in parallel with the pack stopper 4. Thus, by providing a relative movement of the check member 33b with respect to the eject lock arm 32, the relation between the forward movement of the pack stopper 4 to the ejecting position and the locking fixture of the pack guide 1 by the lock plate 13 becomes more reliable than the first embodiment.

Figure 8A:
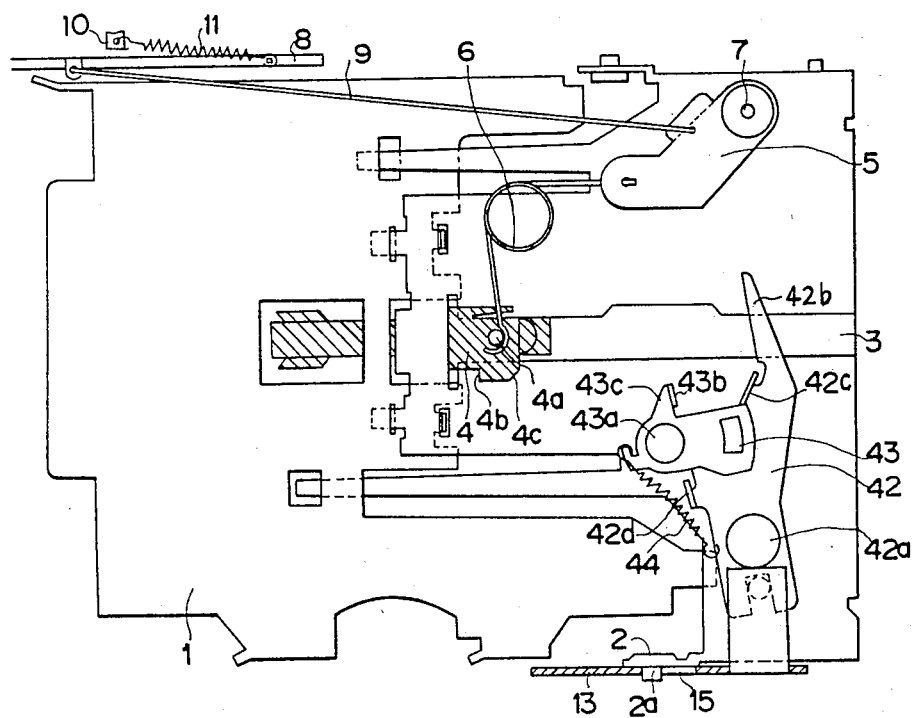
FIGS. 8a and 8b are plan and side-elevation views of third embodiment of the invention wherein a cassette is not loaded yet.
Figure 8B:
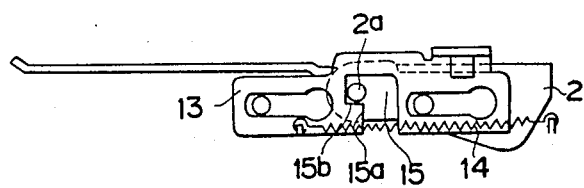
Figure 9A:
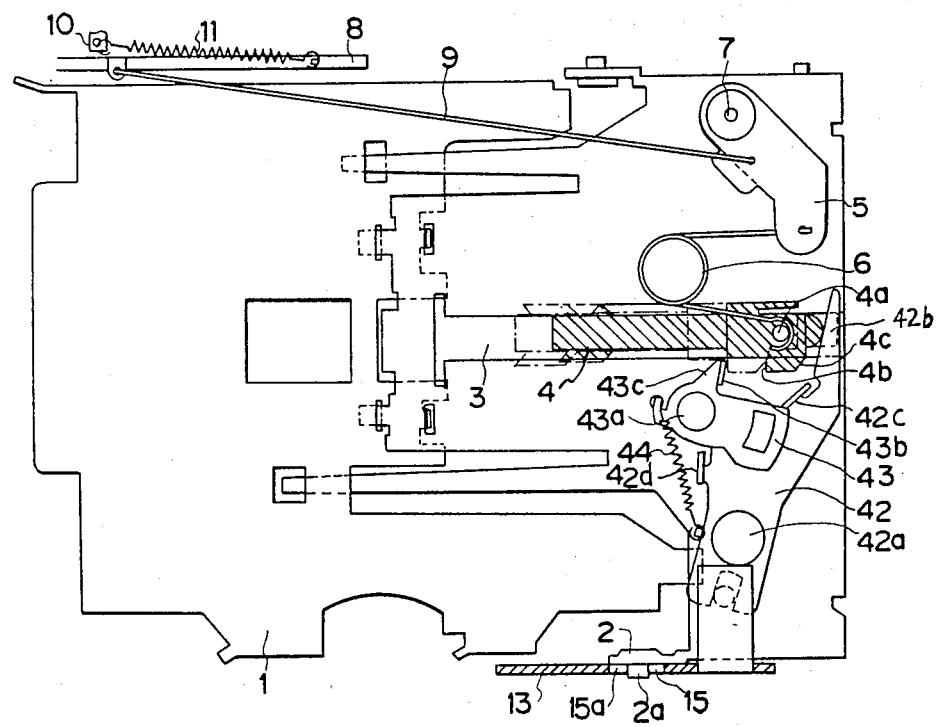
FIGS. 9a and 9b are plan and side-elevation views of the third embodiment wherein an ejection lever is depressed.
Figure 9B:
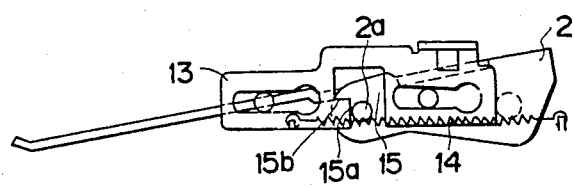
Figure 10A:
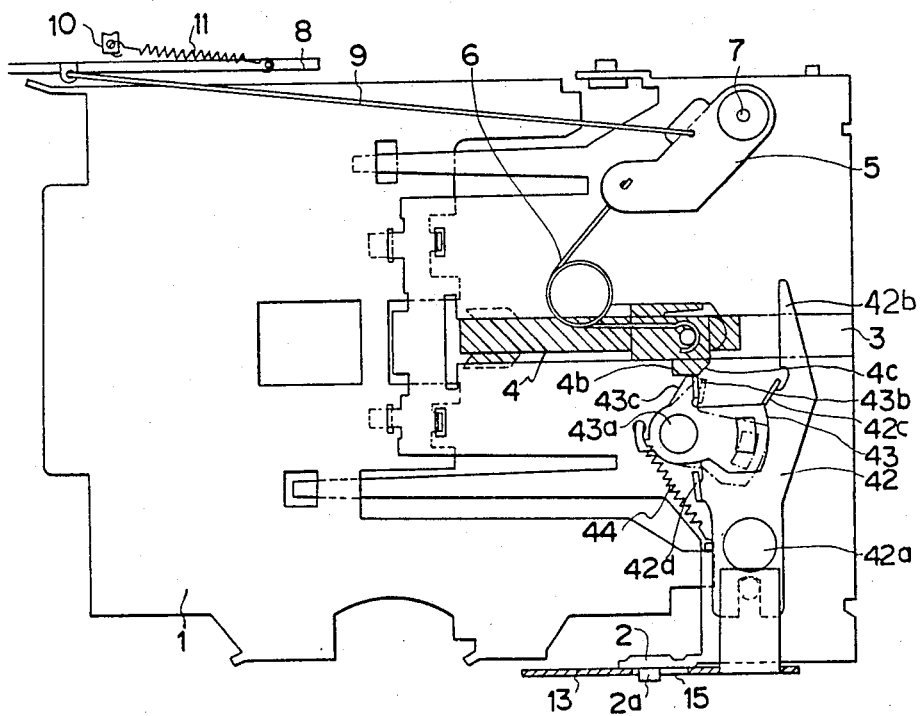
FIGS. 10a and 10b are plan and side-elevation views of the third embodiment wherein a cassette is inserted again.
Figure 10B:
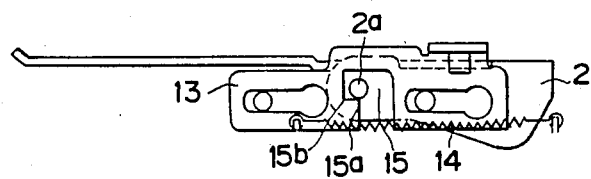

Third Embodiment (FIGS. 8, 9 and 10)

This embodiment employs a check member 43b rotatably connected to an eject lock arm 42, instead of the check member 22c of the first embodiment or of the check member 33b of the second embodiment. The eject lock arm 42 is rotatably mounted on the pack guide 1 by an axle 42a. The eject lock arm 43 carries a sub-arm 43 which is rotatable about an axle 43a over a limited angle. The sub-arm 43 has the check member 43b which is engageable with the step 4b of the pack stopper 4. The sub-arm 43 also has an engagement surface 43c formed back to back with the check member 43b to engage a beveled end 4c formed at the rear end of the pack stopper 4 back to back with the step 4b. The eject lock arm 42 is provided with stoppers 42c and 42d at both sides of the sub-arm 43 to limit the rotation angle of the sub-arm 43. Thereby, the sub-arm 43 can rotate from the counterclockwisely rotated first position whereat the step 4b of the pack stopper 4 completely engages the check member 43b up to the clockwisely rotated second position whereat the beveled end 4c of the pack stopper 4 can disengage from the engagement surface 43c during the rearward displacement of the pack stopper 4. The sub-arm 43 is biased in the counterclockwise direction by a spring 44 affixed to the eject lock arm 42 so as to give the check member 43b and the engagement surface 43c a tendency of confronting the pack stopper 4.

With this arrangement, in response to depression of the ejection lever 8, the pack guide 1 is elevated, the inversion spring 6 is inverted, and the pack stopper 4 and the cassette are pushed forward to the ejecting position, as in the first and second embodiments. At this time, the sub-arm 43 is in the first angular position and abuts the stopper 42c which limits the counterclockwise rotation. Therefore, the check member 43b is located at a position engageable with the step 4b of the pack stopper 4. When the pack stopper 4 is slightly displaced forward by the inverted expansion energy of the inversion spring 6, the step 4b engages the check member 43b and pushes it forward. However, since the eject lock arm 42 and the sub-arm 43 fixed thereto cannot rotate before the pack guide 1 is fully elevated and locked thereby the lock plate 13, the frontward displacement of the pack stopper 4 and the cassette is checked by the check member 43b. After the lock plate 13 moves rearward and locks the pack guide 1 at the fully lifted position, the pack stopper 4 can resume the frontward movement, depressing the check member 43b in the counterclockwise direction. In this case, however, since the stopper 42c disturbs the further counterclockwise rotation of the sub-arm 43 with respect to the eject lock arm 42, the sub-arm 43 can only rotate together with the eject lock arm 42 in the counterclockwise direction about the axle 42a with the pressure from the pack stopper 4 and with the energy of the spring 14 to the lock plate 13, as in the first embodiment.

Meanwhile, when the eject lock arm 42 is fully rotated in the counterclockwise direction, the step 4b disengages from the check member 43b, and the pack stopper 4 continues its frontward displacement and ejects the cassette from the pack guide 1.

Similarly to the first and second embodiments, the third embodiment is also arranged to stop the forward displacement of the pack stopper 4 and the cassette and instead bring them back to the fully inserted position if a manual depression to the ejection lever 8 is removed before the pack guide 1 fully elevated, so as to enable a user to resume the ejecting operation from the start.

Operation of the process of reinsertion of a cassette in the third embodiment is basically same as the first and second embodiments. The third embodiment, however, has a special configuration to facilitate a cassette reinsertion. Namely, it sometimes happens, for some reasons, that the sub-arm 43 or the eject lock arm 42 is slightly rotated in the counterclockwise direction from the positions which they must keep when the ejecting operation is completed, and the check member 43b is deviated frontward, accordingly. In this case, while the pack stopper 4 moves rearward with the energy of the inversion spring 6, the beveled end 4c of the pack stopper 4 engages the engagement surface 43c and rotates the sub-arm 43 in the clockwise direction about the axle 43a against the energy of the spring 44, until the sub-arm 43 abuts the stopper 42d. Meanwhile, when the beveled end 4c further moves rearward and disengages from the engagement surface 43c, then the sub-arm 43 is rotated back in the counterclockwise direction with the energy of the spring 44 up to the proper position to ensure that the check member 43b of the sub-arm 43 can engage the step 4b of the pack stopper 4. Thereafter, the rear end of the pack stopper 4 pushes the contact surface 42b of the eject lock arm 42 and rotates it in the clockwise direction. When the pack stopper 4 fully moves rearward, the pack guide 1 is unlocked by the lock plate 13 and drops onto the reel base. Thus, the cassette loading is completed.

As described above, since the construction of the third embodiment allows the check member 43b for checking forward movement of the pack stopper 4 to rotate with respect to the eject lock arm 42 and also limits the rotation angle, it not only creates the direct linkage between the pack stopper 4 and the eject lock arm 42 but also ensures that a cassette reinsertion is never disturbed by the check member 43b which might be deviated forward at the beginning of the cassette loading.

In the first embodiment, said deviation of the check member 22b occurs for the following reason. If the step 4b of the pack stopper 4 is not sufficiently distant from the check member 22c after their disengagement and upon completion of an ejecting operation, it sometimes occurs that the eject lock arm 22 slightly rotates in the counterclockwise direction due to some impact, and the check member 22c disturbs the rearward movement of the pack stopper 4 for cassette loading. The third embodiment, however, can overcome this phenomenum by providing a relative rotation of the check member 43b with respect to the eject lock arm 42.

The spring 44 employed in the third embodiment to bias the check member 43b in the counterclockwise direction with respect to the eject lock arm 42 may be omitted provided a proper rotatable angle of the sub-arm 43 or a proper positional relation between the step 4b of the pack stopper 4 and the check member 43b is selected. More specifically, if the check member 43b overlaps the movement path of the step 4b when the sub-arm 43 fully rotates in the clockwise direction up to abutment with the stopper 42d of the eject lock arm 42, the check member 43b never fails to engage the step 4b during the forward movement of the pack stopper 4 due to the energy of the inversion spring 6. If the sub-arm 43 is disposed rotatable with the pressure from the pack stopper 4, it will rotate alone about the axle 43a in the counterclockwise direction up to the angular position whereat it abuts the stopper 42c and the pack stopper 4 stops. Thereafter the sub-arm 43 will rotate together with the eject lock arm 42 and give the same effect as in the construction employing the spring 44.

The embodiments of the invention in which an exclusive property is claimed are defined as follows:

1. An ejection mechanism for a tape player, comprising:
    a pack guide into which a tape pack can be inserted in an insertion direction and means supporting said pack guide for movement in directions transverse to said insertion direction between an insertion position and a loaded position;
    a pack stopper and means supporting said pack stopper for movement relative to said pack guide in directions approximately parallel to said insertion direction along a path of movement between first and second positions so that, when said pack guide and said pack stopper are respectively in said insertion and first positions, a tape pack inserted into said pack guide will engage said pack stopper and move it toward its second position, wherein as said pack stopper moves from its first position to its second position it passes through a third position located between said first and second positions;
    a swing plate and means supporting said swing plate for rotation relative to said pack guide between a normal position and an eject position;
    a movable, manually operable ejection lever and means operatively coupling said ejection lever to said swing plate for effecting movement of said swing plate between its normal and eject positions in response to movement of said ejection lever;
    inversion means for yieldably urging said pack stopper toward said first position when said pack stopper is between said first and third positions and when said swing plate is in said normal position, for yieldably urging said pack stopper toward said second position when said pack stopper is between said second and third positions and when said swing plate is in said normal position, and for yieldably urging said pack stopper toward said first position when said swing plate is in said eject position, said inversion means including an inversion spring operatively connected to said pack stopper and to said swing plate;
    an eject lock arm and means supporting said eject lock arm for pivotal movement relative to said pack guide so that a first end of said eject lock arm moves along the path of movement of said pack stopper in the region of said second position of said pack stopper, said first end of said eject lock arm being engageable with a side of said pack stopper facing in said insertion direction;
    a movable lock plate operatively coupled to a second end of said eject lock remote from said first end for movement therewith, said lock plate being moved between a locking position and a release position in response to movement of said eject lock arm, wherein as said lock plate moves to its release position said first end of said eject lock arm moves in said insertion direction, said lock plate having means for releasably locking said pack guide in said insertion position when said lock plate is in said locking position and for permitting said pack guide to move freely between said insertion and loaded positions relative to said lock plate when said lock plate is in said release position;
    a lock spring yieldably urging said lock plate toward said locking position; and
    check means provided on said eject lock arm and engageable with said pack stopper for limiting movement of said pack stopper away from said second position in a direction opposite said insertion direction until said pack guide is in its insertion position and said lock plate is in its locking position.

2. An ejection mechanism as set forth in claim 1, wherein said eject lock arm has at said first end thereof a contact surface which faces in a direction approximately opposite said insertion direction and can engage said side of said pack stopper which faces in said insertion direction, and wherein said check means includes a check member fixedly supported on said eject lock arm and having thereon a contact surface which can engage a step formed on a side of said pack stopper which faces in a direction opposite said insertion direction.

3. An ejection mechanism as set forth in claim 1, wherein said means movably supporting said pack guide includes a pivotally supported guide arm, said eject lock arm being pivotally supported on said guide arm, and said guide arm having a guide slot therein; wherein said check means includes a sub-arm rotatably supported on said eject lock arm, said sub-arm having a check surface which can engage a step provided on said pack stopper and having a pin which is slidably received in said guide slot; and wherein said guide slot has a linear portion extending approximately opposite said insertion direction and merging into an arcuate portion which extends away from said path of movement of said pack stopper.

4. An ejection mechanism as set forth in claim 1, wherein said check means includes a sub-arm rotatably supported on said eject lock arm, and a spring rotationally biasing said sub-arm toward an angular position in which a check surface on said sub-arm can engage a step provided on said pack stopper.

5. An ejection mechanism as set forth in claim 4, wherein said eject lock arm has two stops thereon which can engage said sub-arm to limit the angle of rotation of said sub-arm with respect to said eject lock arm.

6. An ejection mechanism as set forth in claim 1, wherein said means supporting said pack guide includes a guide arm supported for pivotal movement about a pivot axis which is substantially perpendicular to said insertion direction and to the direction of movement of said pack guide, said guide arm extending away from said pivot axis in a direction approximately opposite said insertion direction and having said pack guide supported thereon at a location spaced from said pivot axis, said guide arm having therein a slot which extends in said insertion direction and slidably supports said pack stopper; wherein said swing plate and said eject lock arm are pivotally supported on said guide arm on opposite sides of said slot therein for movement about respective axes which extend approximately parallel to the directions of movement of said pack guide, said eject lock arm extending in a direction approximately perpendicular to said guide slot; wherein said inversion spring is a torsion spring having two legs, one said legs being supported on said pack stopper and the other leg being supported on said swing plate at a location spaced from the pivot axis of said swing plate; and wherein said means on said lock plate for releasably locking said pack guide in said insertion position includes a cutout having a step therein which can engage said pin on a guide arm when said lock plate is in its locking position and which is spaced from said pin on said guide arm when said lock plate is in its release position.

7. An ejection mechanism according to claim 1, wherein said means movably supporting said pack guide includes a guide arm supported for pivotal movement about a stationary pivot axis and having said pack guide supported thereon at a location spaced from said pivot axis, said guide arm pivoting about said pivot axis as said pack guide moves between said insertion and loaded positions; and wherein said pack stopper is movably supported on said guide arm and said swing plate and said eject lock arm are each pivotally supported on said guide arm.

* * * * *